US00RE41566E

(19) United States
(12) Reissued Patent
Suzuki et al.

(10) Patent Number: US RE41,566 E
(45) Date of Reissued Patent: Aug. 24, 2010

(54) OPTICAL FILM AND LIQUID CRYSTAL DISPLAY DEVICE USING THE FILM

(75) Inventors: Masaru Suzuki, Kanagawa (JP); Fumihisa Hanzawa, Sagamihara (JP)

(73) Assignee: AU Optronics Corp., Hsinchu (TW)

(21) Appl. No.: 09/241,989

(22) Filed: Feb. 2, 1999

Related U.S. Patent Documents

Reissue of:
(64) Patent No.: 5,600,462
Issued: Feb. 4, 1997
Appl. No.: 08/121,657
Filed: Sep. 14, 1993

(30) Foreign Application Priority Data

Sep. 16, 1992 (JP) ..... 4-246225

(51) Int. Cl.
*G02F 1/1343* (2006.01)

(52) U.S. Cl. ..... 349/112; 349/62; 349/96; 349/65; 362/615; 362/620

(58) Field of Classification Search ..... 349/61–65, 349/57, 95, 96, 67, 112, 70; 362/606, 607, 362/620, 626, 611, 615, 623, 608, 31, 330, 362/333, 30; 385/901, 146; 359/599, 707, 359/831, 837
See application file for complete search history.

(56) References Cited

U.S. PATENT DOCUMENTS

| | | | | |
|---|---|---|---|---|
| 3,832,541 | A | 8/1974 | Bassett et al. | |
| 4,648,690 | A | 3/1987 | Ohe | |
| 4,725,134 | A | 2/1988 | Ogino | |
| 4,791,540 | A | 12/1988 | Dreyer, Jr. et al. | |
| 4,906,070 | A | 3/1990 | Cobb, Jr. | |
| 5,005,108 | A | 4/1991 | Pristash et al. | |
| 5,005,168 | A | 4/1991 | Pritash et al. | 362/31 |
| 5,056,892 | A | 10/1991 | Cobb, Jr. | |
| 5,159,478 | A | 10/1992 | Akiyama et al. | |
| 5,206,746 | A | 4/1993 | Ooi et al. | |
| 5,262,880 | A | 11/1993 | Abileah | |
| 5,289,351 | A | 2/1994 | Kashima et al. | |
| 5,390,276 | A | 2/1995 | Tai et al. | |
| 5,442,523 | A | 8/1995 | Kashima et al. | |
| 5,552,907 | A | 9/1996 | Yokota et al. | |
| 5,635,278 | A | 6/1997 | Williams | |
| 5,716,681 | A | 2/1998 | Williams | |

FOREIGN PATENT DOCUMENTS

| | | |
|---|---|---|
| EP | 0534140 | 8/1992 |
| EP | 0534140 A1 | 3/1993 |
| EP | 0534141 | 3/1993 |
| JP | 62154422 | 9/1987 |
| JP | 2000017 | 1/1990 |

(Continued)

OTHER PUBLICATIONS

"Polarized Backlight For Liquid Crystal Display," IBM Technical Disclosure Bulletin, vol. 33, No. 1B, pp. 143–144, Jun. 1990.

*Primary Examiner*—Thoi V Duong
(74) *Attorney, Agent, or Firm*—Thomas, Kayden, Horstemeyer & Risley

(57) ABSTRACT

The liminance within the viewing angle of an LCD device is increased by using an optical film of transparent material. The film has a first surface having a wave structure including a plurality of isosceles triangle prisms arranged side-by-side, and a second surface having an optically rough structure for performing diffuse transmission. The film may also have a first surface having a structure including a plurality of quadrangular prisms arranged side-by-side, and a second surface having an optically rough structure for performing diffuse transmission.

18 Claims, 8 Drawing Sheets

FOREIGN PATENT DOCUMENTS

| | | |
|---|---|---|
| JP | 2278243 | 11/1990 |
| JP | 03069184 | 7/1991 |
| JP | 0432888 | 2/1992 |
| JP | 04091905 | 3/1992 |
| JP | 05169015 | 7/1993 |
| JP | 05173134 | 7/1993 |
| JP | 5173134 | 7/1993 |
| JP | 5203950 | 8/1993 |
| JP | 05203950 | 8/1993 |
| JP | 5313004 | 11/1993 |
| JP | 5341132 | 12/1993 |
| JP | 05341132 | 12/1993 |
| JP | 06018707 | 1/1994 |
| JP | 2705868 | 10/1997 |

FIG. 5
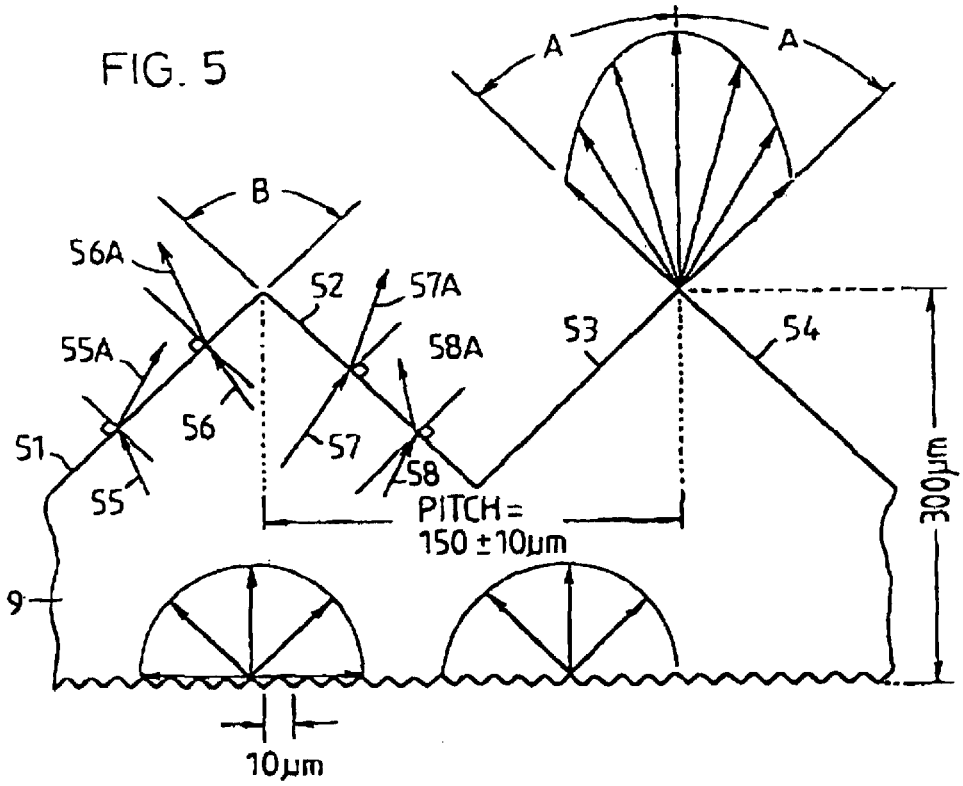
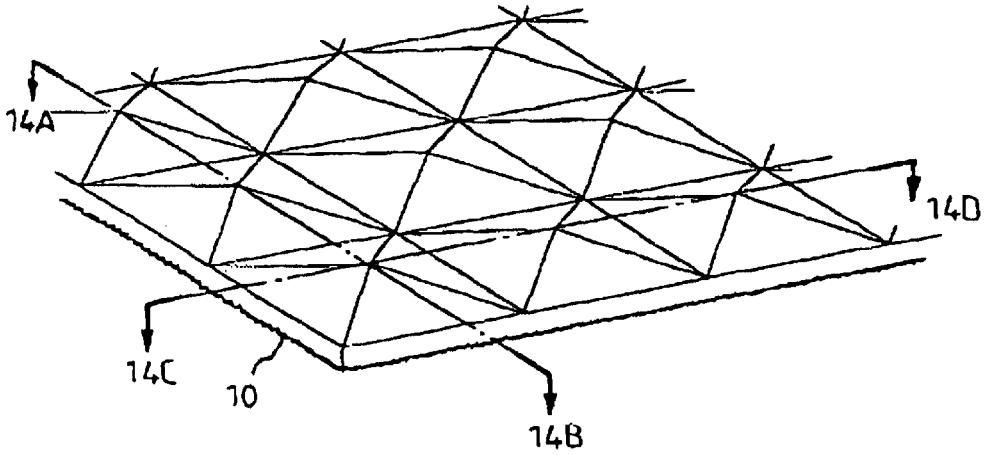
FIG. 14

OPTICAL FILM AND LIQUID CRYSTAL DISPLAY DEVICE USING THE FILM

Matter enclosed in heavy brackets [ ] appears in the original patent but forms no part of this reissue specification; matter printed in italics indicates the additions made by reissue.

FIELD OF THE INVENTION

This invention relates to liquid crystal displays. More particularly it relates to an optical film used in a liquid crystal display (LCD) device and an LCD device including an LCD panel and back light device having the optical film, so as to increase luminance of light within the viewing angle.

BACKGROUND OF THE INVENTION

An LCD device includes an LCD panel, polarizers, a backlight device, and an LCD driver circuit. The backlight device includes one or two fluorescent lamps, and a light guide. The light guide receives light from the fluorescent lamp to transmit light of uniform luminance to the LCD panel.

The light guide has a lower surface for performing diffuse reflection and an upper surface for performing diffuse transmission, whereby light of uniform luminance is directed to the LCD panel from the upper surface.

To enhance the uniformity of the light, various technologies have been developed. One of these technologies is shown in Japanese utility model application 61-197685 (Published unexamined utility model application 63-101921), wherein a backlight device includes a diffuse transmission plate facing an LCD panel, a backside reflector and a lamp positioned between the diffuse transmission plate and the backside reflector. A center portion of the diffuse transmission plate has a Fresnel lens arranged parallel to the lamp.

Recently, color LCD devices used in portable personal computers have required a backlight device of high luminance and low power consumption. The high luminance and the low power consumption are inconsistent with each other, because as small a battery as possible is required in a portable personal computer.

Further, recently portable personal computers have been reduced to A4 size. The size of the LCD device, and particularly the size of the backlight device, must also be reduced.

U.S. Pat. No. 4,906,070 discloses a thin flexible film made of a transparent polymeric material including a structured surface and an opposite smooth surface, wherein light striking either surface within certain angular ranges, is totally internally reflected. The structured surface includes a linear array of miniature substantially right angled isosceles prisms arranged side-by-side to form a plurality of peaks of grooves. Viewed in a broad conceptual sense, the structured surface of the film described in this patent may be perceived as resembling the structure of one surface of the optical film of the present invention. However, the optical film of the present invention differs remarkably from the film disclosed in U.S. Pat. No. 4,906,070. Further, the use of the optical film in the particular position in the LCD device according to the present invention is not disclosed or suggested by this patent.

SUMMARY OF THE INVENTION

It is an object of the invention to provide a high luminance and small size backlight device for the color LCD used in portable personal computers.

In accordance with the invention, an optical film of transparent material comprises a first surface having a wave structure including a plurality of isosceles triangle prisms arranged side-by-side, and a second surface having an optically rough structure for performing diffuse transmission. A top angle of said isosceles triangle prisms is in a range of 95 degrees to 120 degrees.

An optical film of transparent material of the present invention may also comprise a first surface having a structure including a plurality of quadrangular prisms arranged side-by-side, and a second surface having an optically rough structure for performing diffuse transmission. A top angle of said quadrangular prisms is in the range of 95 degrees to 120 degrees.

The liquid crystal display device of the present invention includes a liquid crystal display panel and a back light device. The back light device comprises a light source for emitting light; a light guide means having a top surface facing a back surface of the liquid crystal display panel and a side surface receiving the light from said light source; a reflector means provided on a back surface of the light guide means; and an optical film of transparent material positioned between the back surface of the liquid crystal display panel and the top surface of the light guide means, including a first surface having a wave structure including a plurality of isosceles triangle prisms arranged side-by-side and a second surface having an optically rough structure for performing diffuse transmission. A top angle of the isosceles triangle prisms is in the range of 95 degrees to 120 degrees. A polarizer is positioned between the liquid crystal display panel and the optical film. The direction along which peaks and valleys of the isosceles triangle prisms are oriented is aligned in parallel to a polarizing axis of the polarizer.

The liquid crystal display device of the present invention also includes a liquid crystal display panel and a back light device wherein the back light device comprises a light source for emitting light; a light guide means having a top surface facing a back surface of the liquid crystal display panel and a side surface receiving the light from said light source; a reflector means provided on a back surface of the light guide means; and two optical films of transparent material positioned between the back surface of the liquid crystal display panel and the top surface of the light guide means, each of the optical films including a first surface having a wave structure including a plurality isosceles triangle prisms arranged side-by-side and a second surface having an optically rough structure for performing diffuse transmission. A top angle of the isosceles triangle prisms is in the range of 95 degree to 120 degrees.

The direction along which peaks and valleys of the isosceles triangle prisms of one of the two optical films are oriented is at an angle with respect to a direction along which peaks and valleys of the isosceles triangle prisms of the other of the two optical films are oriented.

A polarizer is positioned between the liquid crystal display panel and the two films, and the direction along which the peaks and valleys of the isosceles triangles prisms of the optical film nearer to said polarizer is oriented is parallel to a polarizing axis of the polarizer.

The liquid crystal display device of the present invention also includes a liquid crystal display panel and a back light device wherein the back light device comprises a light source for emitting light; a light guide means having a top surface facing a back surface of the liquid crystal display panel and a side surface receiving the light from the light source; a reflector means provided on a back surface of the light guide means; and an optical film of transparent material positioned between the liquid crystal display panel and the light guide means, including a first surface having a structure including a plurality of quadrangular prisms arranged side-by-side and a second surface having an optically rough structure for performing diffuse transmission. A top angle of the quadrangular prisms is in the range of 95 degrees to 120 degrees.

A polarizer is positioned between the liquid crystal display panel and the optical film. The direction along which peaks and valleys of the quadrangular prisms of the optical film is parallel is oriented to a polarizing axis of said polarizer.

The liquid crystal display device of the present invention also includes a liquid crystal display panel and a back light device wherein the light device comprises a light source for emitting light; a light guide means of transparent material having a top surface facing a back surface of the liquid crystal display panel, a bottom surface and a side surface receiving the light from the light source; a reflector means provided on a back surface of the light guide means; and a film of material performing diffuse transmission formed on an edge area of the bottom surface of said light guide means adjacent to said light source.

BRIEF DESCRIPTION OF THE DRAWINGS

FIG. 5 illustrates various light paths in the optical film of the present invention.

FIG. 14 illustrates an alternative structure of the optical film of the present invention.

DETAILED DESCRIPTION OF THE PREFERRED EMBODIMENTS

Figure 1:
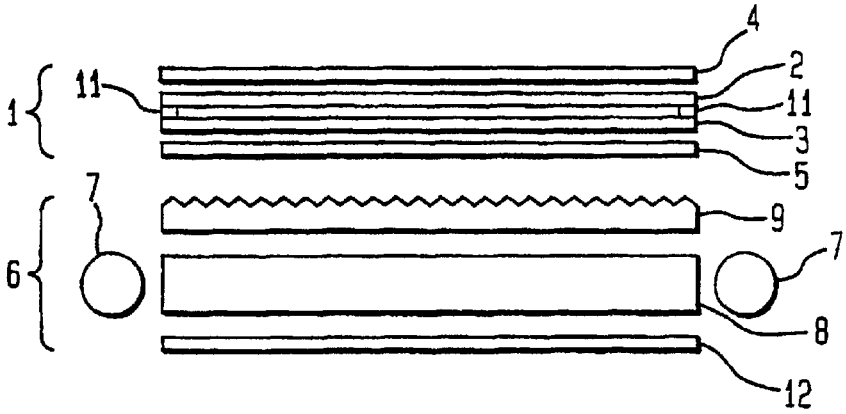
FIG. 1 is a schematic cross sectional view of an LCD device in accordance with the present invention.

FIG. 1 shows an LCD device which comprises an LCD glass panel 1, polarizers 4 and 5 and a backlight device 6. The LCD glass panel 1 includes two glass substrates 2 and 3, peripheral edges of which are sealed by an edge seal 11, such as epoxy resin, and liquid crystal material retained between the glass substrates 2 and 3. The polarizing axis of polarizer 4 is perpendicular to the polarizing axis of polarizer 5.

Figure 2:
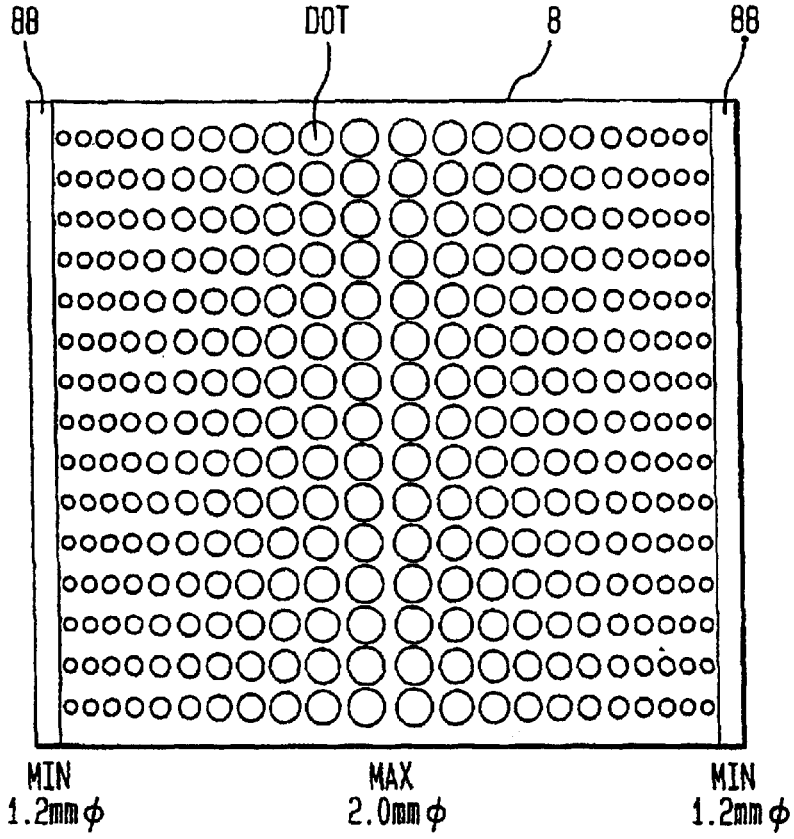
FIG. 2 is a plan view of the light guide of the present invention.
Figure 3:
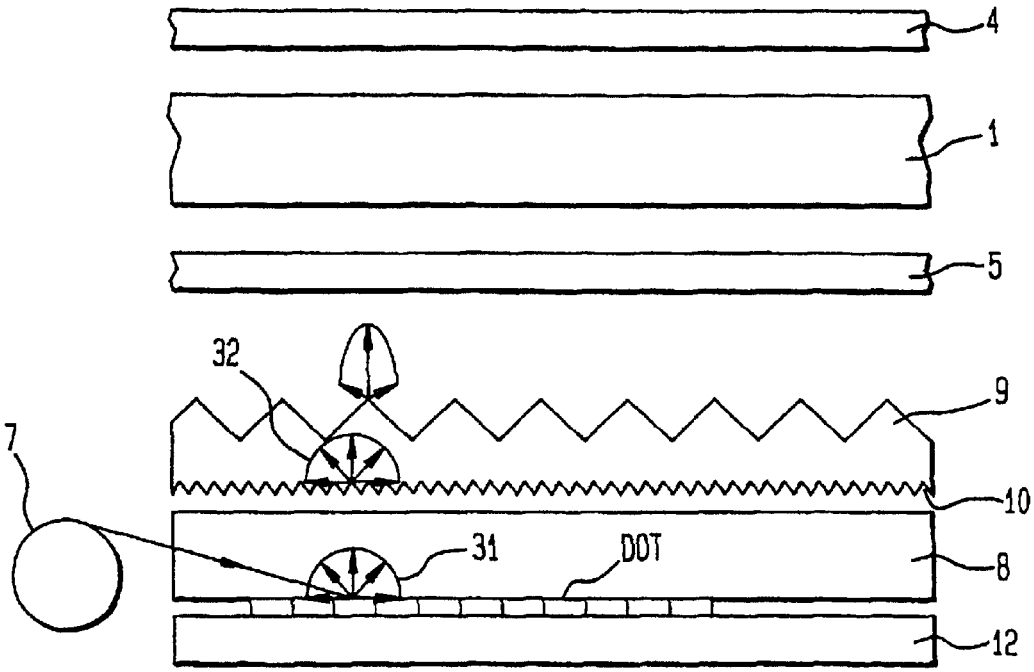
FIG. 3 is an enlarged cross sectional view of a portion of the LCD device of the present invention.

The backlight device 6 includes fluorescent lamps 7, a light guide 8 and a thin optical film 9. The light guide 8 is made of transparent material, such as polymethylmethacrylate. On a first or bottom surface of the light guide 8, a reflective dot pattern of a reflective material e.g. alumina is printed, as shown in FIG. 2. The size of the printed dots are varied from about 2 mm at the center portion to about 1.2 mm at the peripheral portion. The second or upper surface of the light guide 8 is not provided with the printed dots. The second surface of the light guide faces the optical film 9, as shown in FIG. 3. Each dot performs a diffuse reflection which is shown by a reference number 31.

The printed dots cause the light from the fluorescent lamps 7 to be reflected toward the LCD panel 1 with substantially uniform luminance.

Figure 4:
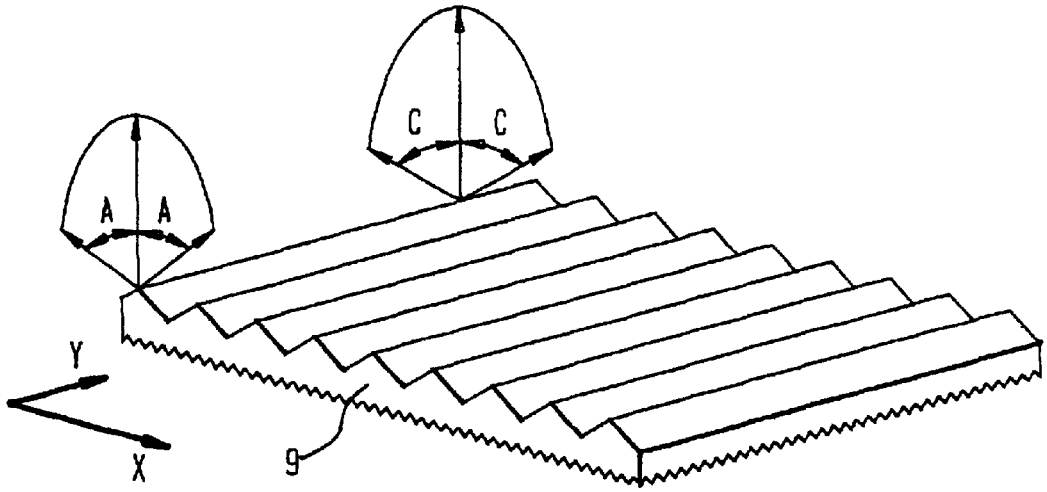
FIG. 4 is an perspective view of the structure of the optical film of the present invention.

The structure of the optical film 9 is shown in FIGS. 4 and 5. The optical film 9 is made of a transparent material which has a total transmission equal to or more than 98% and a refractive index of 1.5 to realize a large critical angle from the material to air. Examples of materials for the optical film 9 are polymethylmethacrylate or polycarbonate.

A lower or first surface of the optical film 9 has an optically rugged or rough structure which is similar to the surface of frosted glass. The optically rough structure is required to provide a diffuse transmission wherein light of the same intensity or luminance is diffused in substantially all directions within a range of 180 degrees, as shown by a reference number 32 in FIG. 3. The distance between peaks of the rough structure is about 10 micrometers. If the first or bottom surface is optically smooth, diffuse transmission does not occur. Diffuse transmission at the first surface is required to prevent the printed dot pattern of the light guide 8 from being observed by an operator. More particularly, the light form the fluorescent lamps 7 is diffuse-reflected at each dot. The, the light is diffused by the diffuse transmission of the optically rough structure of the optical film 9. If the optically rough structure is not formed on the first surfaces of the optical film 9, the printed dot pattern of the light guide 8 is observed by human eyes. This degrades the quality of a displayed image.

An upper or second surface of the optical film 9 has a wave structure, as shown in FIGS. 3, 4 and 5, which includes a plurality of isosceles triangle prisms arranged side-by-side with peaks and valleys being arranged in parallel to each other.

In order to decrease loss of light transmitted to the LCD panel 1, the direction of the peaks and valleys is aligned with a polarizing axis 5A of the polarizer 5, as described below with refer to FIGS. 8, 9, 10 and 12.

FIG. 5 shows various light paths inside and outside of the optical film 9. As described below, the incidental light into the rough structure of the bottom of the optical film 9 is diffuse-transmitted. The diffused light 55, 56, 57, 58 reaches surfaces 51, 52 at various angles and is refracted, as shown in FIG. 5. The refracted light 55A, 56A, 57A, 58A is gathered within a range defined by an angle 2A.

Figure 6:
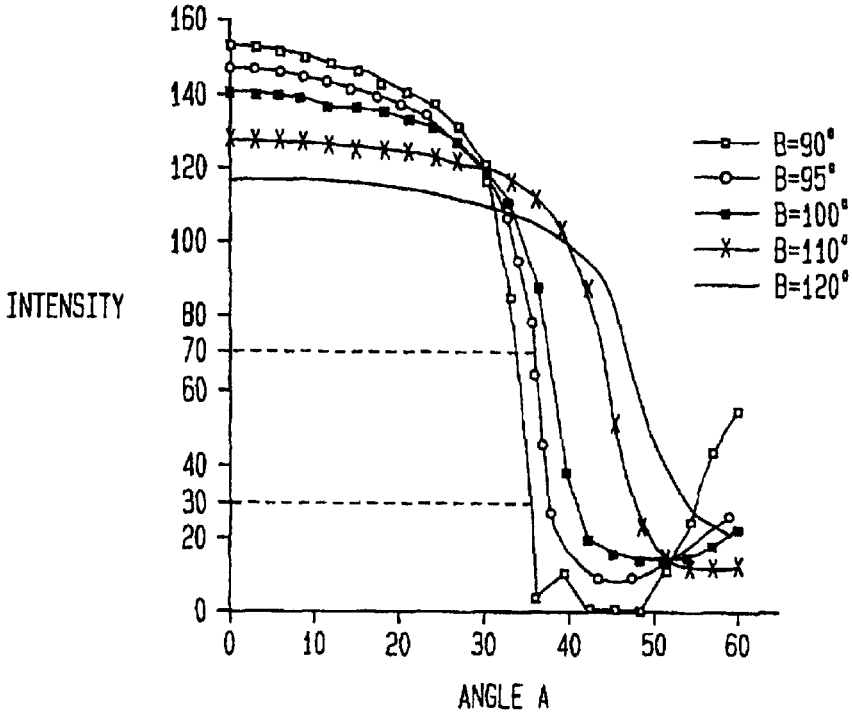
FIG. 6 illustrates the characteristic curves of the optical film of the present invention.
Figure 7:
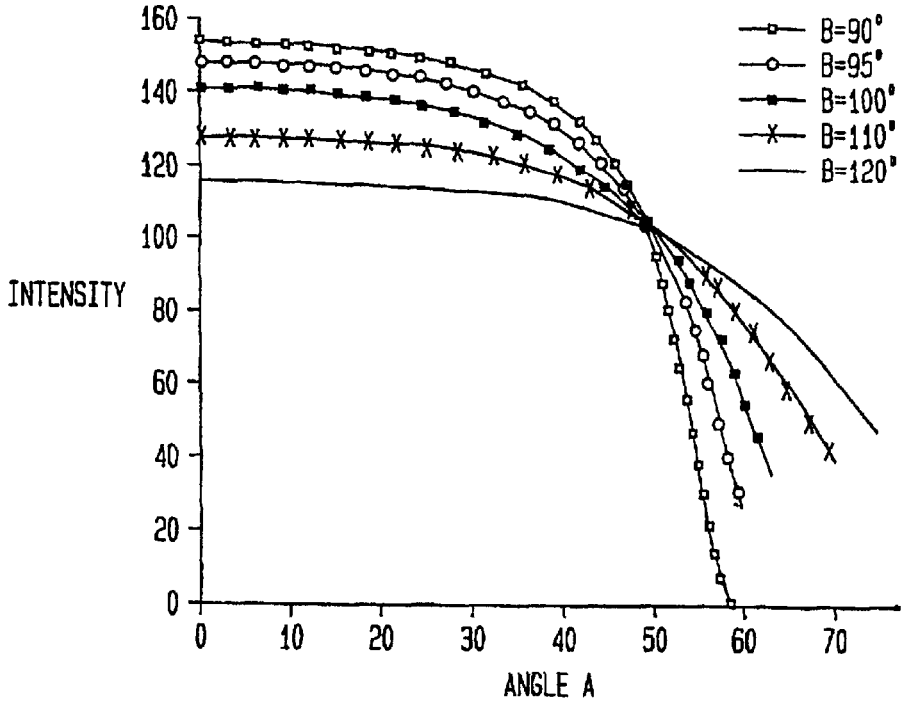
FIG. 7 illustrates additional characteristic curves of the optical film of the present invention.

Angle A depends upon the top angle B of the isosceles triangle prism, as shown in FIGS. 6 and 7, which illustrate experimentally measured results.

Before describing the curves in FIG. 6, the viewing angle of the LCD device is described. As well known in the art, the viewing angle is defined as an angle with respect to a line normal to the surface of the LCD device at which an image displayed on the LCD device can be satisfactorily observed by the operator. The viewing angle in the vertical direction is at least ±35 degrees, and the viewing angle in the horizontal direction is approximately ±55 degrees. The light from the fluorescent lamps is gathered within the viewing angle of the LCD device by the optical film 9 of the present invention. In other words, the luminance of light within the viewing angle of the LCD device is increased and the luminance of light outside the viewing angle of the LCD device is decreased by the optical film 9.

Figure 8:
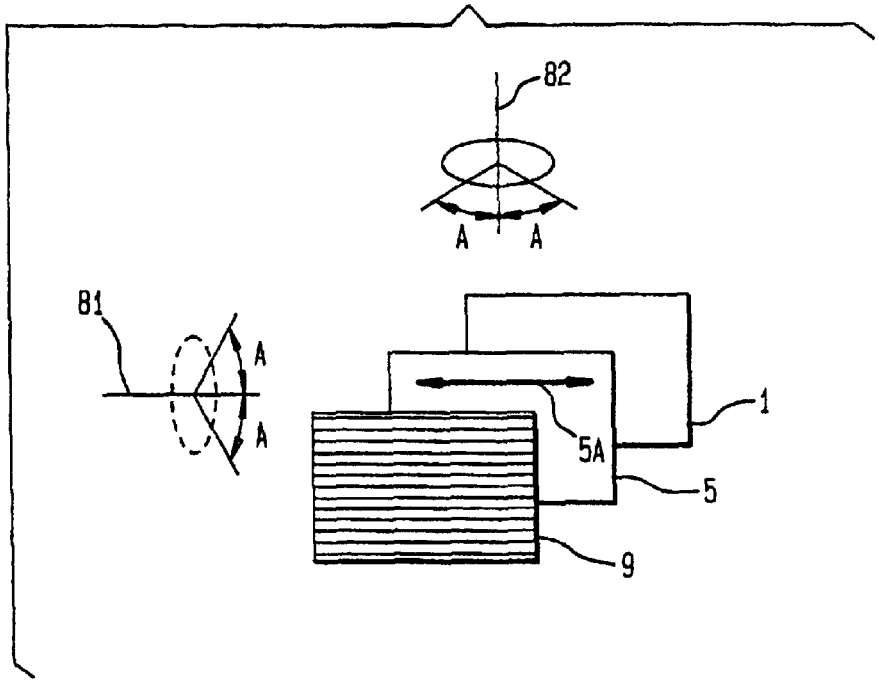
FIG. 8 is a schematic representation of a first arrangement according to present invention.

Referring again to FIG. 6, the vertical axis represents the relative luminance (represented as a percentage), and the horizontal axis represents the angle A. Angle A was measured by arranging the peaks and valleys of the optical film 9 in the horizontal direction of the LCD panel 1 and by rotating the LCD device around an axis 81, as shown in FIG. 8. Since the purpose of the FIGS. 8, 9, 10, 12 and 13 is to show the direction of peaks and valleys of the optical film 9 or 10 with respect to the polarizing axis 5A of the polarizer 5 and the LCD panel 1, the polarizer 4 and the backlight device 6 are not shown in these figures.

The value 100% on the vertical axis in FIG. 6 represents the luminance when the optical film 9 is not inserted between the polarizer 5 and the light guide 8. The five curves represent the cases of various top angles B of the isosceles triangle prism of the optical film 9. It is apparent in FIG. 6 that the luminance within the particular angle is increased by inserting the optical film 9 between the polarizer 5 and the light guide 8. The increase of the luminance is caused by the light gathering effect of the optical film 9.

In accordance with the present invention, a preferred top angle B is 95 degrees to 120 degrees, for the following reasons.

Comparing the five curves, in the case of the angle B=90 degrees, the luminance at the required vertical viewing angle A=35 degrees is 30%. The luminance required for a practical use of the LCD device for providing a minimum image quality is 65–70%. Therefore, the luminance of 30% at a top angle B=90 degrees at A=35 degrees causes a degradation of image quality. The luminance of the angle B=95 degrees at the view angle A=35 degrees is 70%, so that the required minimum image quality is realized.

The curve of B=120 degrees shows a highest luminance value of 117%. But, if the angle B is more than 120 degrees, the luminance is decreased to a level of approximately 100%, and there is less merit in using the optical film 9. Based upon this discovery, the upper limit of the angle B is selected to be 120 degrees.

FIG. 7 shows the relationship between the relative luminance and the angle A measured by arranging the peaks and valleys of the optical film 9 in the horizontal direction of the LCD panel 1 and by rotating the LCD device around an axis 82, as shown in FIG. 8. The value of 100% on the vertical axis in FIG. 7 represents a luminance when the optical film 9 is not inserted between the polarizer 5 and the light guide 8.

Comparing the five curves in FIG. 7; in the case of the angle B=90 degrees, the luminance at the required horizontal viewing angle A=55 degrees is 30%. In the case of the angle B=95 degrees, the luminance at the viewing angle A=55 degrees is 65%. Since the luminance required for the practical use of the LCD device for providing a minimum image quality is 65–70%, as stated above, the angle B=95 degrees is selected.

The curve of B=120 degrees shows a highest luminance value of 115%. If an angle B of more than 120 degrees is used, the luminance is decreased to approximately 100%. Based upon this discovery, the upper limit of the angle B is selected to be 120 degrees.

Based upon the experimental data shown in the FIGS. 6 and 7, the preferred top angle B is from 95 degrees to 120 degrees.

Figure 10:
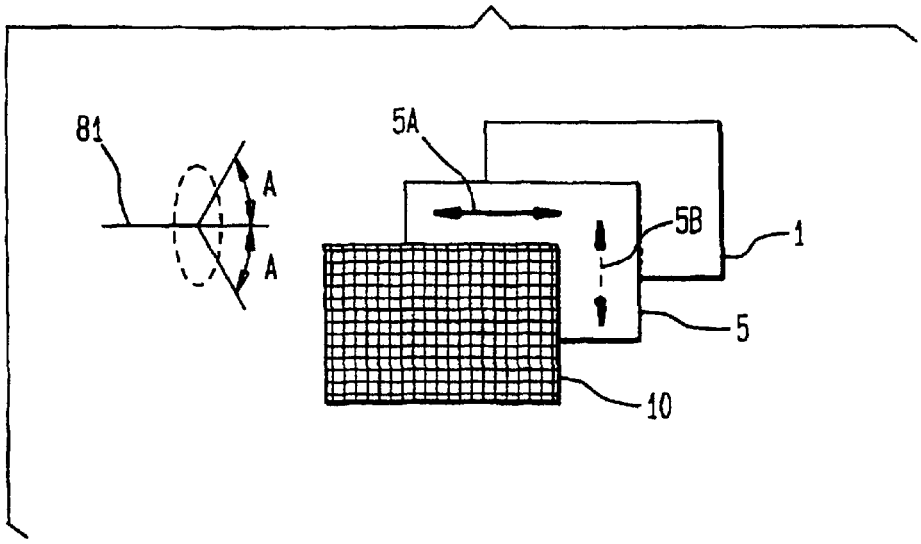
FIG. 10 is a schematic representation of a third arrangement according to the present invention.
Figure 11:
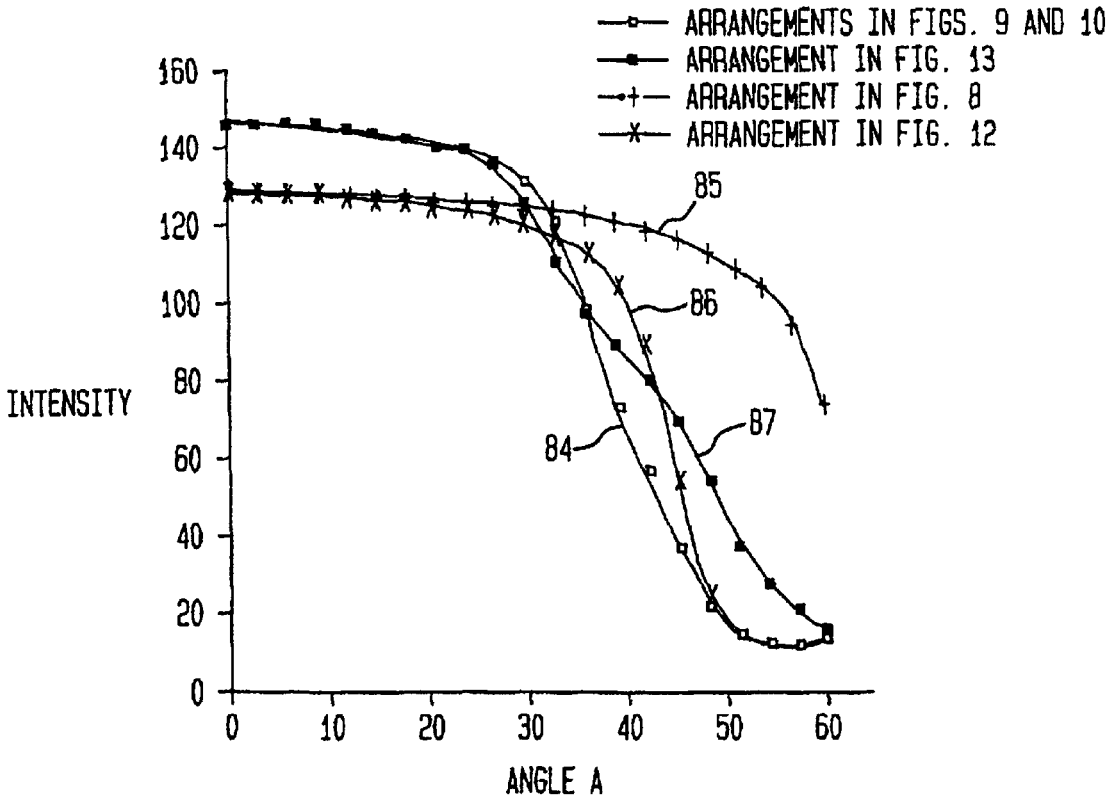
FIG. 11 illustrates further characteristic curves of the optical films of the present invention.

FIG. 11 shows four characteristic curves 84, 85, 85 and 87. Curve 84 was obtained by rotating the arrangement shown in FIGS. 9 and 10 around axis 81. Curve 85 was obtained by rotating the arrangement shown in FIG. 8 around axis 82. Curve 86 was obtained by rotating the arrangement shown in FIG. 12 around axis 81. Curve 87 was obtained by rotating the arrangement shown in FIG. 13 around axis 81 or 82.

Figure 9:
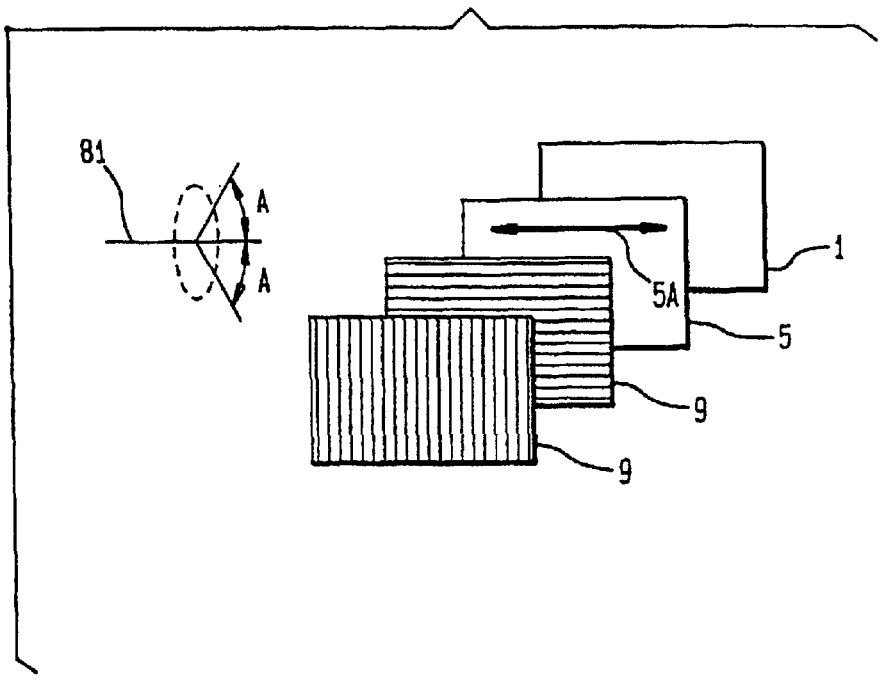
FIG. 9 is a schematic representation of a second arrangement according to the present invention.
Figure 12:
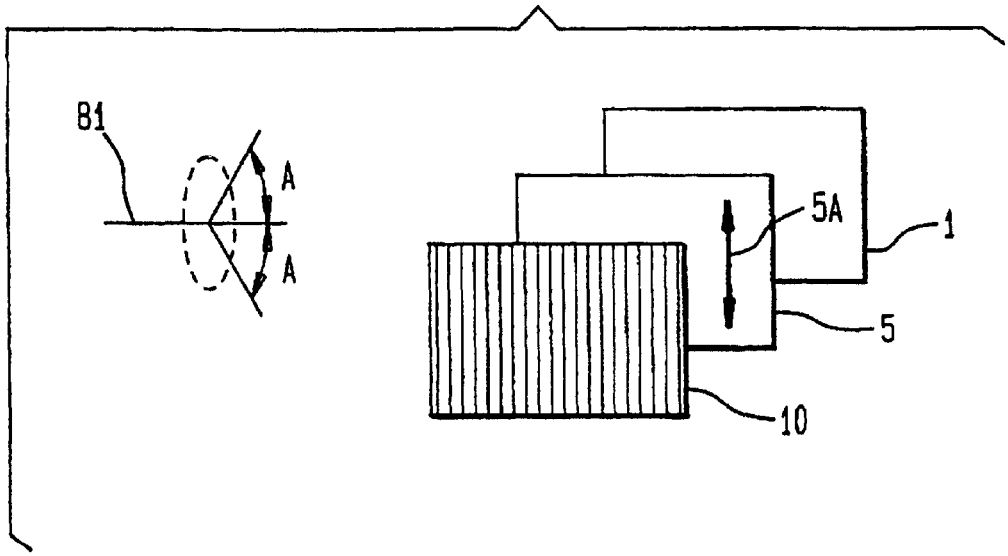
FIG. 12 is a schematic representation of a fourth arrangement according to present invention.

In FIG. 8, the direction of the peaks and valleys of the optical film 9 is oriented along the polarizing axis 5A of the polarizer 5. In FIG. 12, the direction of the peaks and valleys of the optical film 9 is oriented along the polarizing axis 5A of the polarizer 5. In FIG. 9, two optical films 9 overlap each other, and, the direction of the peaks and valleys of one of the two optical films 9 is perpendicular to the direction of the peaks and valleys of the other of the two optical films 2.

The optical film 10 used in FIG. 10 is shown in FIG. 14. Optical film 10 has a plurality of quadrangular prisms arranged side-by-side in a regular array of rows and columns. A cross-section along line 14A–14B and line 14C–14D is the same as that shown in FIG. 5. The material of the optical film 10 is the same as that of the optical film 9. The single optical film 10 performs the same function as that of the two optical films 9 arranged orthogonal to each other.

The optical films 9 and 10 used in the arrangements shown in FIGS. 8, 9, 10, 12 and 13 have the angle B=110 degrees.

The arrangement shown in FIG. 8 has horizontal viewing angle A=0–60 degrees in which luminance of about 130%–70% is maintained, (as shown in FIG. 7) and has vertical viewing angles A=0–43 degrees in which luminance of about 127%–70% is maintained (as shown in FIG. 6).

The film arrangement shown in FIG. 12 has horizontal viewing angles A=0–43 degrees in which luminance of about 130%–70% is maintained (as shown in FIG. 6) and has a vertical viewing angles A=0–60 degrees in which luminance of about 128%–70% is maintained (as shown in FIG. 7).

The arrangement shown in FIGS. 9 and 10 has a higher luminance (approximately 148%–125%) in the viewing angles A=0–30 degrees, although the luminance in the angles A=31–60 degrees is lower than that represented by curve 85, as shown in FIG. 11.

Figure 13:
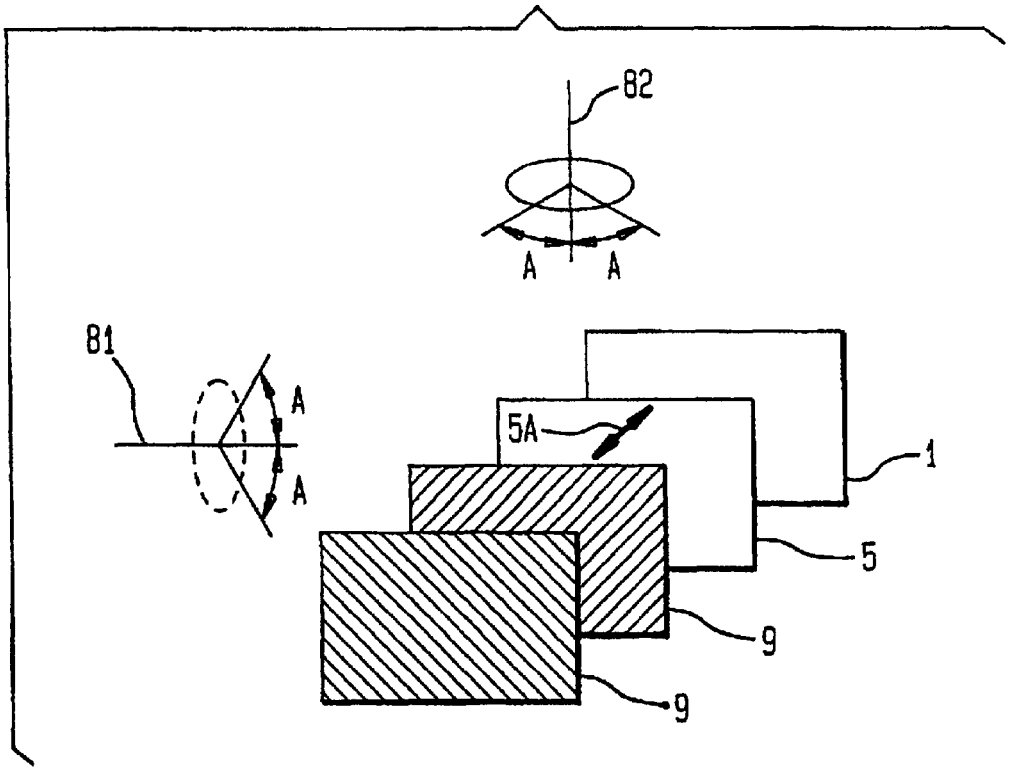
FIG. 13 is a schematic representation of a fifth arrangement according to the present invention.

The arrangement shown in FIG. 13 has a luminance comparable to that of the arrangement shown in FIGS. 9 and 10 at angles of 0–36 degrees, and has a higher luminance than that of the arrangement of FIGS. 9 and 10 at angles of 37–45 degrees.

It is apparent that the optical films 9 and 10 of the present invention increases the luminance of the LCD device at the ordinary viewing angles A=±35 degrees and A=±55 degrees.

The distance between the peaks of the optical film 9 and 10 is defined as the pitch, as shown in FIG. 5. The pitch is selected to prevent interference fringes from being observed by an operator when the optical film 9 or 10 is used in the LCD panel 1. The panel may have gate lines spaced from each other by 330 micrometers and data lines spaced from each other by 110 micrometers. It has been experimentally found by the inventors of the present invention that no interference fringes have been observed if the pitch is equal to or less than 150 micrometers.

Figure 15:
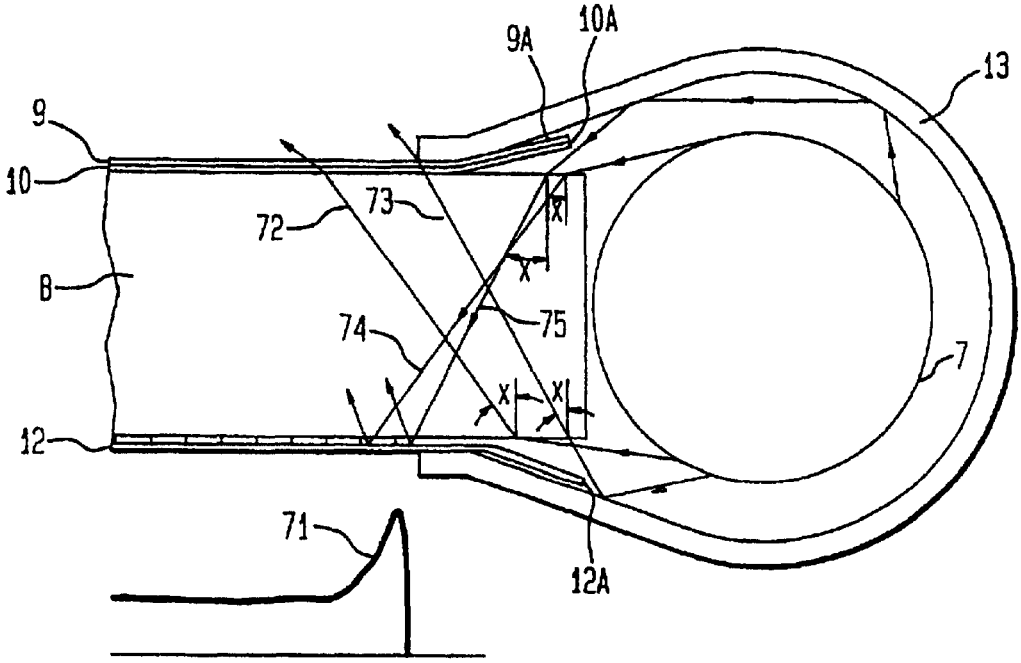
FIG. 15 is an enlarged cross sectional view of a prior art structure.

FIG. 15 shows a problem encountered in a prior structure for mounting the fluorescent lamp 7 to the light guide 8. The optical plate 9 or 10 and the reflector plate 12 are mechanically pressed to the light guide 8 by a cylindrical reflector plate 13. The fluorescent lamp 7 is mounted on the reflector plate 13 by supporting members (not shown). When these parts are assembled, end portions 9A or 10A of the optical film 9 or 10 are forced into close contact with the upper surface of the light guide 8, and end portion 12A of the reflector plate 12, which is a white film, is forced into close contact with the lower surface of the light guide 8.

It has been found by the inventors of the present invention that the luminance 71 at the edge portion of the LCD panel is undesirably increased, as shown in FIG. 15, so that image quality is remarkably degraded, and that such increase in the luminance is caused by a separation of end portions 9A, 10A and 12A from the surface of the light guide 8 over a period of time due to the high temperature of the fluorescent lamp 7. More particularly, it has been found that an undesired peak in the luminance is caused mainly by light along paths 72 and 73 which directly passes at a sharp angle X from bottom surface of the light guide 8 without diffuse transmission to the LCD panel, and light along paths 74 and 75 which passes at angle X from the upper surface of the light guide 8.

Figure 16:
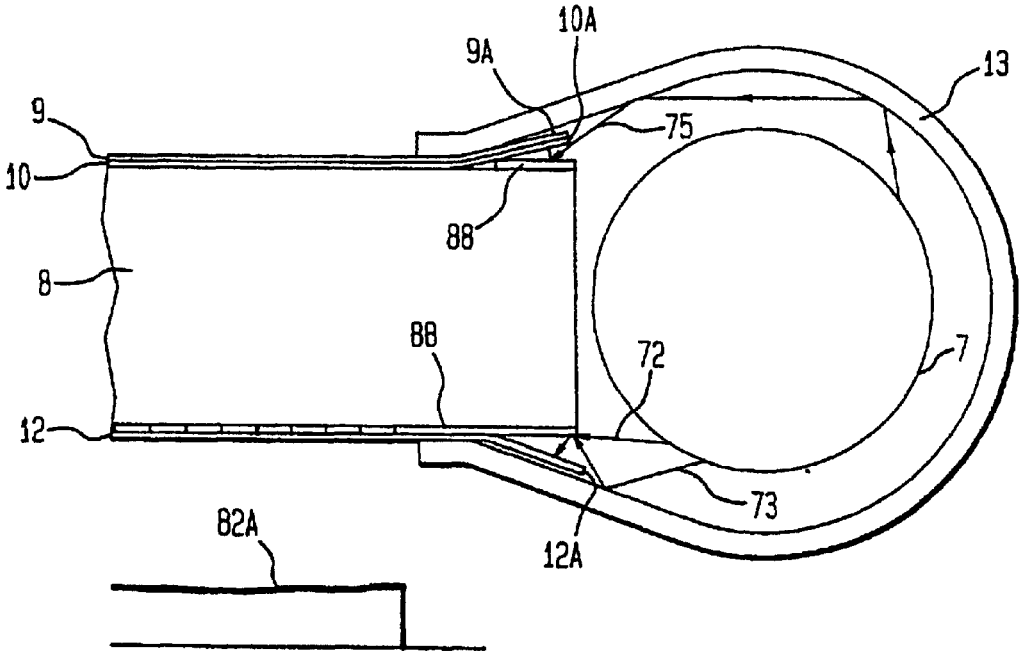
FIG. 16 is an enlarged cross sectional view of a structure in accordance with the present invention.

In accordance with the present invention, to solve the problem, thin coatings 88 are deposited or coated on the edge of the bottom and upper surface of the light guide 8, as shown in FIGS. 2 and 16. Coating 88 is formed of a material which has low transmittance and performs perfect diffuse transmission. Coatings 88 prevent the light from paths 72, 73 and 75 from being directly transmitted from the bottom and upper surfaces of the light guide 8, whereby a uniform or even luminance 82A can be realized, as shown in FIG. 16. The coatings 88 are made of alumina (aluminum oxide) or white paint.

While the invention has been described in connection with specific embodiments, it will be understood that those with skill in the art may be able to develop variations of the disclosed embodiments, without departing from the spirit of the invention or the scope of the following claims.

What is claimed is:

1. A liquid crystal display device including a liquid crystal display panel and a back light device, said back light device comprising:

a light source for emitting light;

a light guide means having a top surface facing a back surface of said liquid crystal display panel and a side surface receiving said light from said light source;

a reflector means provided on a back surface of said light guide means; and an optical film of transparent material positioned between said back surface of said liquid crystal display panel and said top surface of said light guide means, including a first surface having a wave structure including a plurality of regularly spaced isosceles triangles prisms arranged side-by-side, the prisms having smooth surfaces, and a second surface having an optically rough structure for performing diffuse transmissions, wherein a top angle of said isosceles triangle prisms is in a range of 95 degrees to 120 degrees for flat, angles prism surfaces to gather light from the diffuse transmission into a desired viewing angle for the liquid crystal display panel,

*wherein a polarizer is positioned between said liquid crystal display panel and said optical film, and a direction along which said peaks and valleys of said isosceles triangle prisms are oriented is aligned in parallel to a polarizing axis of said polarizer and the tops of the isosceles triangle prisms are not farther than 160 μm apart.*

[2. A liquid crystal display device according to claim 1, wherein a polarizer is positioned between said liquid crystal display panel and said optical film, and a direction along which said peaks and valleys of said isosceles triangle prisms are oriented is aligned in parallel to a polarization axis of said polarizer and the tops of the isosceles triangle prisms are not farther than 160 μm apart.]

3. A liquid crystal display device including a liquid crystal display panel and a back light device, said back light device comprising:

a light source for emitting light;

a light guide means having a top surface facing a back surface of said liquid crystal display panel and a side surface receiving said light from said light source;

a reflector means provided on a back surface of said light guide means; and two optical films of transparent material positioned between said back surface of said liquid crystal display and said top surface of said light guide means, each of said optical films including a first surface having a wave structure including a plurality of isosceles triangle prisms arranged side-by-side, the prism having smooth surfaces, and a second surface having an optically rough structure for performing diffuse transmission wherein a top angle of said isosceles triangle prisms is in a range of 95 degrees to 120 degrees for flat, [angled] *angles* prism surfaces to gather light from the diffuse transmission by the second surface into a desired viewing angle for the liquid crystal display panel.

4. A liquid crystal display device according to claim 3, wherein a direction along which peaks and valleys of said isosceles triangle prisms of one of said two optical films is oriented is at an angle with respect to a direction along which peaks and valleys of said isosceles triangles prisms of another of said two optical films are oriented.

5. A liquid crystal display device according to claim 3, wherein a polarizer is positioned between said liquid crystal display panel and said two optical films, and a direction along which peaks and valleys of said isosceles triangle prisms of said optical film closer to said polarizer is oriented in parallel to a polarizing axis of said polarizer and the tops of the isosceles triangle prisms are no more than 160 μm apart.

6. A liquid crystal display device including a liquid crystal display panel and a back light device, said back light device comprising:

a light source for emitting light;

a light guide means having a top surface facing a back surface of said light crystal display panel and a side surface receiving said light from said light source;

a reflector means provided on a back surface of said light guide means; and an optical film of transparent material positioned between said liquid crystal display panel and said light guide means, including a first surface having a structure including a plurality of quadrangular prisms, which are substantially the same size and shape, in an orderly matrix of equally spaced prisms, the prisms having smooth surfaces, and a second surface having an optically rough structure for performing diffuse transmission wherein a top angle of said quadrangular prisms is in a range of 95 degrees to 120 degrees for flat, angles sides of the prisms to gather the light from the diffuse transmission of the second surface into the desired viewing angle for the liquid crystal display device,

*wherein a polarizer is positioned between said liquid crystal display panel and said optical film, and a direction along which said peaks and valleys of said quadrangular prisms are oriented is aligned in parallel to a polarizing axis of said polarizer.*

7. A liquid crystal display device according to claim 6, wherein a polarizer is positioned between said liquid crystal display panel and said optical film, and a direction along which peaks and valleys of said quadrangular prisms of said optical film are oriented in parallel to a polarizing axis of said polarizer and the tops of the quadrangle prisms are no more than 160 μm apart.

*8. A liquid crystal display device including a liquid crystal display panel and a back light device, said back light device comprising:*

*a light source for emitting light;*

*a light guide having a top surface facing a back surface of said display panel and a side surface receiving said light from said light source;*

*a reflector provided on a back surface of said light guide; and*

*an optical film of light transparent material positioned between said back surface of said liquid crystal display panel and said top surface of said light guide, said optical film including a first surface having an optically rough structure for diffuse-transmitting said light from said light guide and a second surface having a wave structure including a plurality of isosceles triangle prisms arranged side-by-side, the prisms having smooth surfaces for refracting said light diffuse-transmitted from said first surface to gather light passing through said second surface in a direction toward said display panel, wherein a top angle of said isosceles triangle prisms of said optical film is in a range of about 90 degrees to about 120 degrees for flat, angles prism surfaces to gather light from the diffuse transmission and directionally distribute said light within a range defined by a given angle,*

*wherein a polarizer is positioned between said liquid crystal display panel and said optical film, and a direction along which said peaks and valleys of said isosceles triangle prisms are oriented is aligned in parallel to a polarizing axis of said polarizer and the tops of the isosceles triangle prisms are not farther than 160 μm apart.*

*9. The liquid crystal display device according to claim 8, wherein luminance of said gathered light is increased within and decreased outside of a desired viewing angle of about 35 degrees in the vertical direction and about 55 degrees in the horizontal direction of said display panel.*

*10. The liquid crystal display device according to claim 8, further including a second optical film positioned between said back surface of said liquid crystal display panel and said top surface of said light guide, wherein a direction along which peaks and valleys of said isosceles triangle prisms of one of said two optical films are oriented is at an angle with respect to a direction along which peaks and valleys of said isosceles triangles prisms of another of said two optical films are oriented.*

*11. The liquid crystal display device according to claim 10, wherein said angle is perpendicular.*

*12. The liquid crystal display device according to claim 10, wherein a polarizer is positioned between said liquid crystal display panel and said two optical films, and a direction along which peaks and valleys of said isosceles triangle prisms of said optical film closer to said polarizer is oriented in parallel to a polarizing axis of said polarizer.*

*13. An optical film of light transparent material including a first surface having an optically rough structure for diffuse-transmitting incident light and a second surface having a wave structure including a plurality of isosceles triangle prisms arranged side-by-side, the prisms having smooth surfaces for refracting said light diffuse-transmitted from said first surface and directionally distributing said diffuse-transmitted light through said second surface for increasing illumination within a viewing angle of about 35 degrees in the vertical direction and about 55 degrees in the horizontal direction wherein a top angle of said isosceles triangle prisms is a range of about 90 degrees to about 120 degrees,*

*wherein a polarizer is positioned between a liquid crystal display panel and said optical film, and a direction along which at least a portion of peaks and valleys of said isosceles triangle prisms are oriented is aligned in parallel to a polarizing axis of said polarizer and the tops of the isosceles triangle prisms are not farther than 160 μm apart.*

*14. The optical film according to claim 13, wherein a polarizer is positioned between a liquid crystal display panel and said optical film, wherein a direction along which peaks and valleys of said isosceles triangle prisms are oriented is aligned in parallel to a polarizing axis of said polarizer.*

*15. An optical film of light transparent material including a first surface having an optically rough structure for diffuse-transmitting incident light and a second surface having a wave structure including a plurality of isosceles triangle prisms arranged side-by-side, the prisms having smooth surfaces for refracting said light diffuse-transmitted from said first surface and directionally distributing said diffuse-transmitted light through said second surface wherein a top angle of said isosceles triangle prisms is in a range of about 90 degrees to about 120 degrees, wherein the tops of the isosceles triangle prisms are no more than 160 μm apart, and wherein a polarizer is positioned between a liquid crystal display panel and said optical film, and a direction along which at least a portion of peaks and valleys of said isosceles triangle prisms are oriented is aligned in parallel to a polarizing axis of said polarizer.*

*16. An optical film for use in a liquid crystal display having a front portion and a back portion, said optical film comprising:*

*diffusing means including an optically rough structure on a first surface of said film for diffuse-transmitting light illuminated proximal to said back portion of said display; and*

*refracting means on a second surface of said film including a plurality of isosceles triangle prisms arranged side-by-side for directionally distributing said diffuse-transmitted light toward said front portion of said display and for increasing luminance of light within a viewing angle of about 35 degrees in the vertical direction and about 55 degrees in the horizontal direction of said front portion of said display, wherein a top angle of said isosceles triangle prisms is in a range of about 90 degrees to about 120 degrees,*

*wherein a polarizer is positioned between said liquid crystal display panel and said optical film, and a direction along which at least a portion of peaks and valleys of said isosceles triangle prisms are oriented is aligned*

*in parallel to a polarizing axis of said polarizer and the tops of the isosceles triangle prisms are not farther than 160 μm apart.*

*17. The optical film according to claim 16, wherein a polarizer is positioned between said front portion of said liquid crystal display and said optical film, wherein a direction along which peaks and valleys of said isosceles triangle prisms are oriented is aligned in parallel to a polarizing axis of said polarizer.*

*18. A film for use in an optical system comprising a light source and a polarizer having a polarization axis, the film comprising a transparent material including a first surface and a second surface, said first surface having a structure including a plurality of isosceles triangular prisms arranged side-by-side for increasing luminance of light passing through said film in a direction corresponding to said polarization axis of said polarizer, and said second surface having an optically rough structure for diffuse transmitting light emitted by said light source, wherein a top angle of said isosceles triangle prisms is in a range of about 90 degrees to about 120 degrees, wherein the tops of the isosceles triangle prisms are no more than 160 μm apart, and wherein said polarizer is positioned between a liquid crystal display panel and said film, and a direction along which at least a portion of peaks and valleys of said isosceles triangle prisms are oriented is aligned in parallel to a polarizing axis of said polarizer.*

*19. The optical film according to claim 18, wherein said optical film is positioned within a liquid crystal display, said prisms having smooth surfaces for gathering diffuse transmitted light for increasing illumination within and decreasing illumination outside of a viewing angle of about 35 degrees in the vertical direction and about 55 degrees in the horizontal direction of the liquid crystal display.*

* * * * *